United States Patent
Rosenhahn et al.

(10) Patent No.: US 7,799,125 B2
(45) Date of Patent: *Sep. 21, 2010

(54) YELLOW IRON OXIDE PIGMENTS

(75) Inventors: Carsten Rosenhahn, Krefeld (DE); Robert Madersdorfer, Sao Paulo (BR); Ingo Schnellrath, Sao Paulo (BR); Sergio dal alba Guazzelli, Campinas (BR)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/194,580

(22) Filed: Aug. 20, 2008
(Under 37 CFR 1.47)

(65) Prior Publication Data
US 2009/0199737 A1   Aug. 13, 2009

Related U.S. Application Data

(63) Continuation of application No. 11/800,404, filed on May 4, 2007, now abandoned.

(30) Foreign Application Priority Data
May 13, 2006  (DE)  ........................ 10 2006 022 449

(51) Int. Cl.
C09C 1/24 (2006.01)
C09D 1/00 (2006.01)
C09D 11/00 (2006.01)
C09D 7/12 (2006.01)
C01G 49/02 (2006.01)
C09K 3/22 (2006.01)
A23L 1/275 (2006.01)
A61K 47/02 (2006.01)

(52) U.S. Cl. .................... 106/456; 106/31.9; 106/460; 106/712; 162/162; 423/632; 424/446; 426/250; 524/431

(58) Field of Classification Search ................ 106/31.9, 106/456, 460, 712; 162/162; 423/632; 424/446; 426/250; 524/431
See application file for complete search history.

(56) References Cited

U.S. PATENT DOCUMENTS

| 1,327,061 | A | 1/1920 | Penniman, Jr. et al. | 423/632 |
| 1,368,748 | A | 2/1921 | Penniman, Jr. et al. | 423/633 |
| 5,076,848 | A | 12/1991 | Krockert et al. | 106/456 |
| 5,451,253 | A | 9/1995 | Klingelhoefer et al. | 106/456 |
| 6,042,642 | A | 3/2000 | Braun et al. | 106/456 |
| 6,627,212 | B2 * | 9/2003 | Uzunian et al. | 424/439 |
| 2005/0045066 | A1 | 3/2005 | Meisen et al. | 106/456 |

FOREIGN PATENT DOCUMENTS

| DE | 24 55 158 | | 5/1975 |
| EP | 0704500 A1 | * | 9/1995 |
| GB | 1445288 A | * | 8/1976 |
| JP | 3-195779 A | * | 8/1991 |

OTHER PUBLICATIONS

DIN 6174 Colorimetric Evaluation of Colour Differences of Surface Colous According to the CIELAB Formula (91/1979).*
DIN 53 235 (Part 1 and 2) "Testing of Specimens with A Standard Depth of Shade" (Sep. 1977) & (Nov. 1974).*
EN 21524/DIN ISO 1524 "Paints Varnishes and Printing Inks—Determination of Printing Inks" (Jun. 2002).*
Derwent ACC-No. 1975-36310W, abstract of DE 2455158A (May 1975).*
Ullmann's Encyclopedia of Industrial Chemistry, 5$^{th}$ ed., vol. A20, p. 297ff.
European Search Report from co-pending Application No. EP 07 008767 dated Aug. 5, 2009, 5 pages.

* cited by examiner

*Primary Examiner*—Anthony J Green
(74) *Attorney, Agent, or Firm*—Nicanor A. Kohncke

(57) ABSTRACT

The present invention relates to improved yellow iron oxide pigments and to their use.

8 Claims, 1 Drawing Sheet

25/–/–μm  <10/25/35μm  15/–/–μm  10/25/–μm

<10/–/30μm  <10/25/35μm

YELLOW IRON OXIDE PIGMENTS

This application is a continuation of U.S. patent application Ser. No. 11/800,404 filed May 4, 2007, now abandoned, the contents of which are hereby incorporated by reference in their entirety.

BACKGROUND OF THE INVENTION

1. Field of the Invention

The present invention relates to improved yellow iron oxide pigments and to their use.

2. Brief Description of the Prior Art

The precipitation process and also the Penniman-Zoph process of producing yellow iron oxide pigments have been known for a long time. The typical course of these processes is described by way of example in Ullmann's Encyclopaedia of Industrial Chemistry, 5th Ed., Vol. A20, p. 297 ff., or in U.S. Pat. No. 1,327,061 A1 and U.S. Pat. No. 1,368,748 A1 and DE 3907910 A1. The raw material and electrolyte catalyst used is commonly iron(II) sulphate, which is obtained in the pickling of steel sheets or in the production of titanium dioxide by the sulphate process. A further possibility is the use of iron (II) sulphate from the production of low-alloy steel residues in the form of sheets, wire rolls, Fe powder with sulphuric acid. In general, α-FeOOH (yellow iron oxide) is prepared from iron (II) salts by the precipitation process (DE 2 455 158 A1) or by the Penniman process (U.S. Pat. No. 1,368,748 A1, U.S. Pat. No. 1,327,061 A1). In both processes a nucleus is produced first of all, onto which then, in a further step, relatively slowly, additional α-FeOOH is caused to grow.

The yellow iron oxide pigments produced by these processes are notable for a bright, yellow colour, but have an oil absorption value the end user finds unfavourable.

The oil absorption value is determined in accordance with DIN 53199, which dates from 1973. With the aid of the oil absorption value the practitioner is able to estimate the binder demand of a pigment. The higher the oil absorption value, the higher, too, the binder demand. The oil absorption value also, moreover, permits conclusions concerning the level of the pigment-volume concentration to be expected.

A pigment with a lower oil absorption value can be processed in a more eco-friendly manner, thereby simplifying the process and lowering the energy consumption for the end user. Low oil absorption in oxides allows the user, especially in the paint industry, to use a composition having a greater amount of oxide and a lower level of additives in order to achieve the desired quality for the product. The higher pigment-volume concentration permits a greater colour density in paste production, which in turn is beneficial to the specific transport costs of the pigment pastes.

A high colour strength additionally boosts the desired effects for the end user.

It was an object of the present invention, therefore, to develop pigments which, with a low oil absorption value and high colour strength, have a colour locus comparable with that of prior-art pigments.

SUMMARY OF THE INVENTION

This object has been achieved by means of a yellow iron oxide pigment having an oil absorption value<25 and either an a* value of >4.3 measured by CIELAB units in white reduction in L64 to DIN 6174 and/or a b* value of >34 measured by CIELAB units in white reduction L64 to DIN 6174 or an a* value>10 measured by CIELAB units in full shade to DIN 6174 and/or a b* value of >45 measured by CIELAB units in full shade to DIN 6174, and a reduction ratio for standard depth of shade B 1/9 to DIN 53235 Part 1 and 2 of >−6.5.

The yellow iron oxide pigment has, for example, a dispersibility to EN 21524/DIN ISO 1524 (2002) in the extended "3-box method" form of better than 30-50-70.

DETAILED DESCRIPTION OF THE INVENTION

The yellow iron oxide pigment has, for example, a water absorption value<50.

The yellow iron oxide pigment has, for example, a BET>14.

The yellow iron oxide pigment has, for example, a bulk density>0.4.

The yellow iron oxide pigment has, for example, a tamped density>0.7. The high bulk density and tamped density not only makes it easier to produce the formula but also has consequences for the transport costs and storage costs.

The yellow iron oxide pigment has, for example, a viscosity in MAP <−25 against Bayferrox® 3910.

The methods of measuring the properties described above are specified in the examples.

Process Description for the Production of Yellow Iron Oxide

The process of producing the yellow iron oxide pigments is divided into two parts: nucleus preparation and pigment preparation.

Nucleus Preparation

In accordance with the following equation:

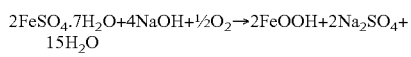

$$2FeSO_4 \cdot 7H_2O + 4NaOH + \tfrac{1}{2}O_2 \rightarrow 2FeOOH + 2Na_2SO_4 + 15H_2O$$

the iron oxide nucleus is prepared from an iron sulphate solution by addition of aqueous sodium hydroxide solution with air oxidation. This gives FeOOH in the form of microcrystals (nucleus).

In order to obtain a bright yellow it is necessary for the average temperature of the reaction to be kept below 35° C.

Pigment Preparation

In accordance with the following equations:

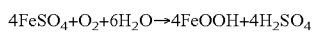

$$4FeSO_4 + O_2 + 6H_2O \rightarrow 4FeOOH + 4H_2SO_4$$

$$Fe\,(iron\ scrap) + H_2SO_4 \rightarrow FeSO_4 + H_2$$

the nucleus prepared in the first process step is built up to a crystal by addition of iron scrap, with oxidation by atmospheric oxygen.

Subsequently the product is washed salt-free, so that the conductivity of the washing water which runs off is no more than 2 mS/cm. At the end of the filtering process we obtain an iron oxide paste having a moisture content of 50%. After that the product is dried and ground.

The invention also embraces the use of the yellow iron oxide pigment for colouring organic or inorganic dispersions, products of the ink, paint, coating, building-material, plastics and paper industry, in foods, and in products of the pharmaceutical industry such as tablets.

The subject matter of the present invention is given not only by the subject matter of the individual claims but also by the combination of the individual claims with one another. The same applies to all of the parameters disclosed in the description, and to their combinations as desired.

The examples which follow illustrate the invention, without any intention that they should restrict the invention. The quantities given in % by weight refer in each case to the pigment used.

EXAMPLES

Description of Measurement Methods Used

A. Measurement of Colour Coordinates in L64, White Reduction and Full Shade

The pigment was prepared using the Muller in a non-drying test binder. The test binder (paste) is composed of two components for the white reduction; for the full shade only component 1 is used:

Component 1

SACOLYD® L640 (Krems Chemie AG, AU, alkyd resin binder based on linseed oil and phthalic anhydride) (formerly ALKYDAL® L64 (Bayer AG, DE)). It corresponds to the specifications given in standards DIN EN ISO 787-24 (October 1995), ISO 787-25: 1993 and DIN 55983 (December 1983) as requirements of a test binder for colour pigments.

Component 2

LUVOTHIX® HT (Lehmann & Voss & Co., DE, pulverulent, modified, hydrogenated castor oil) as a theological additive added for the thixotroping of the paste. It was used in a concentration of 5.0% by weight, based on component 1.

Component 2 was dissolved in component 1 at 75-95° C. The cooled, compact material was passed once through a triple-roll mill. With this step the L64 paste was complete. A plate type paint dispersing machine (muller) was used, of the kind described in DIN EN ISO 8780-5 (April 1995). The apparatus employed was an Engelsmann Jel 25/53 muller with an effective plate diameter of 24 cm. The speed of the bottom plate was approximately 75 $min^{-1}$. The force between the plates was set at about 0.5 kN by insertion of a 2.5 kg loading weight suspended from the loading bracket.

The reductant used was a commercially customary titanium dioxide pigment, TRONOX® R-KB-2, Kerr-McGee Corp., US) (formerly BAYERTITAN® R-KB-2 (Bayer AG, DE)). R-KB-2 corresponds in its composition to type R 2 in ISO 591-1977. 0.4 g of test pigment, 2.0 g of TRONOX® R-KB-2 and 3.0 g of paste were dispersed in five stages of 25 revolutions each by the method described in DIN EN ISO 8780-5 (April 1995) section 8.1. For the full shade measurement, 1 of test pigment is dispersed in 3 g of component 1 in five stages each of 25 revolutions in accordance with the method described in DIN EN ISO 8780-5 (April 1995) section 8.1.

The pigment paste mixture was subsequently spread into a paste plate corresponding in its function to the paste plate in DIN 55983 (December 1983). The doctor blade associated with the paste plate is drawn over the indentation in the plate that is filled with the pigment paste mixture, to produce a smooth surface. The doctor blade is moved in one direction with a speed of about 3-7 cm/s. The smooth surface is measured within a few minutes.

Colorimeter

A spectrophotometer ("calorimeter") having the d/8 measuring geometry without a gloss trap was used. This measuring geometry is described in ISO 7724/2-1984 (E), section 4.1.1, in DIN 5033 part 7 (July 1983), section 3.2.4 and in DIN 53236 (January 1983), section 7.1.1.

A DATAFLASH® 2000 measuring instrument (Datacolor International Corp., USA) was employed. The calorimeter was calibrated against a white ceramic working standard, as described in ISO 7724/2-1984 (E) section 8.3. The reflection data of the working standard against an ideally matt-white body are deposited in the calorimeter so that, after calibration with the white working standard, all coloured measurements are related to the ideally matt-white body. The black-point calibration was carried out using a hollow black body from the calorimeter manufacturer.

Colorimetry

The result of the colorimetry is a reflection spectrum. As far as the calculation of calorimetric parameters is concerned, the illuminant used to take the measurement is unimportant (except in the case of fluorescent samples). From the reflection spectrum it is possible to calculate any desired colorimetric parameter. The calorimetric parameters used in this case are calculated in accordance with DIN 6174 (CIELAB values).

A gloss trap, if present, is switched off. The temperature of calorimeter and test specimen was approximately 25° C.±5° C.

B. Colour Strength

The colour coordinates are stated in accordance with the measurement described above to DIN 6174 (CIELAB values). The measurement in the white reduction also results in the colour strength of the colour pigment measured (see Table 1). In order to state an absolute characteristic value from these figures, the so-called "reduction ratio" was calculated. The reduction ratio was determined in accordance with DIN standard 53235 part 1 and part 2 from 1974 for the standard depth of shade B 1/9. Illustratively, the reduction ratio indicates the ratio of a colour-imparting substance to a mixing component (in the present case: $TiO_2$) with which a defined depth of shade (depth of colouring) in accordance with DIN standard 53235 part 1 and part 2 from 1974 is achieved. A high reduction ratio means that the same depth of colouring can be achieved with less pigment. Such a pigment is therefore more strongly coloured in practical application.

C. Dispersibility

The method is described in DIN ISO 1524, "Determination of fineness of grind (particle size)", and, as a characteristic value, accordingly, the value is read off (in μm) "below which a relatively large number of pigment particles becomes visible as bits or scratches on the surface (of the spread-out paint). Individual bits or scratches that may have appeared are not taken into account in this consideration (FIG. 1)."

The "3-box" method employed for testing the pigments is an extended form of reading off, in which three values are reported as the result.

The main region, in the form of a close coherent array of bits; above it a region with a moderately high concentration of bits; and finally, over that, a region with a very low concentration of bits (individual bits, virtually, but appearing reproducibly) (FIG. 2). Therefore of a trio of values is recorded that characterizes the upper limits of the three regions indicated. A grindometer spread according to FIG. 2 is assessed, accordingly, as follows: <10/25/35 μm.

By virtue of their position within the trio the three values clearly indicate the kind of the three arrays of bits to which they are to be assigned. If, in specific cases, one of the three regions does not occur, then a line (for examples of this see FIGS. 1, 3, 4 and 5) appears at the point in question.

If the concentration of bits is remarkably high within one region (but without attaining the density of the adjacent region), this can be indicated by underlining the limit value in question. An example of this is shown in FIG. 6 (in comparison with FIG. 2).

D. Water Absorption Value

The water absorption value was determined in accordance with DIN 55608 (June 2000).

E. BET Surface Area

The BET surface area was determined via the carrier gas method (He:$N_2$=90:10) in accordance with the one-point method, to DIN 66131 (1993). Prior to the measurement the sample is heated in a stream of dry nitrogen at 140° C. for 1 h. The measuring temperature is 77 K.

F. Bulk Density

The bulk density was determined for the finished material without further treatment of the product, from the ratio of mass to volume.

G. Tamped Density

The tamped density was determined in accordance with ISO 787 part 11 (1995).

H. Viscosity

An in-depth description of the theological properties is found in "Rheology and rheometry with rotational viscometers", HAAKE KG, 1 Berlin 37. The following apparatus was used for determining the viscosity:

- Krebs-Stormer viscosimeter KU-1+ (manufacturer: Braive Instruments)
- Paddle stirrer (KU1-10). Ø 55 mm, height 8 mm
- Laboratory dissolver with speed control
- Dissolver disc, Ø 60 min, coarse-toothed, tooth height 5 mm
- Laboratory balance resolution 0.01 g
- Plastic beaker 800 ml, Ø 100 mm
- Cooling bath The MAP (multi-purpose tinting paste) standard stock solution (18-litre bucket), which is available commercially (from BASF, for example) and is known to the skilled person, should be homogenized at 1000 $min^{-1}$ for 10 minutes prior to use.

224.4 g of the MAP solution are introduced into an 800 ml poly beaker.

Accompanied by cooling in a water bath (15±3° C.), 346.0 g of pigment are incorporated in portions using a laboratory dissolver at approximately 1000±200 $min^{-1}$. In the course of incorporation it should be ensured that no pigment settles on the surface; if appropriate, raise the level of the stirrer or increase the rotary speed for a short time.

When all of the pigment has been stirred in, the stirring shaft and inner wall of the beaker are cleaned to remove particles of pigment that have not been wetted. For this purpose the stirrer is switched off briefly and lifted from the sample beaker. The walls of the beaker are cleaned with a spatula. Then the stirrer is lowered again and restarted.

The distance of the toothed disc from the base is approximately 10 mm. The speed is increased to 3000±100 $min^{-1}$. The time of dispersing at this speed is 15 minutes.

During the dispersing time the paste is adjusted to a pH of 8.5±0.5 by addition of 10% strength sodium hydroxide solution (quantity approximately 3-6 ml); the pH must in no case fall below 7.5. It is necessary to check the pH a number of times within the dispersing time, since the pH value is subject to creeping variation.

The poly beaker is sealed with a lid and cooled in a water bath at 20° C. for 30 minutes.

The viscosity standard must in each case be prepared in parallel.

Prior to the viscosity measurement the temperature of the paste should be checked (target value 20° C.). The difference between sample and reference must not be more than 2° C.

Furthermore, the paste should be stirred briefly with a spatula prior to measurement.

The paddle stirrer of a commercially available standard Krebs-Stormer viscosimeter should be introduced to the point where the marking on the shaft can still just be seen. The result reported is the value which no longer shows any change over about 1 minute. The paddle stirrer is cleaned after each measurement.

KU of sample minus KU of reference=delta KU

The reference used was Bayferrox 3910 Standard 1987, although it is also possible to use the comparison pigments described in this patent. A viscosity of ±5 against Comparative Example 2, for example, is an outstanding value.

II. Examples

Indicated below is the general description for preparation. The preparation conditions for the Inventive and Comparative Examples are found in the respective tables.

Nucleus Preparation

Equipment: open stirring kettle with a capacity of 65 $m^3$, nozzle introduction of air, circulation pump and a mechanical stirrer.

Preparation

The reactor is charged with 27.0 $m^3$ of plant water and 0.47 t (11.7 $m^3$) of iron sulphate heptahydrate ($FeSO_4.7H_2O$). After the circulation pump and stirrer have been switched on, 667 kg (9.532 l) of dissolved sodium hydroxide (NaOH+$H_2O$) are added. Thereafter the air feed is commenced. The air feed takes place, for example, with a throughput of 250±200 $m^3$/h or, for example at 170±85 $m^3$/h. The volume is made up with industrial water.

In order to obtain a bright yellow (Examples 1-3) it is necessary to maintain the average temperature of the reaction at below 35° C.

Form the 50 $m^3$ nucleus suspension an average of 835 kg of FeOOH in the form of microcrystals are obtained.

The monitored parameters are as follows:

BET ($m^2$/g): surface area of crystal

Free sulphate (g/l): excess iron sulphate heptahydrate which has not reacted. It acts as an electrolyte in the subsequent size enlargement reaction.

FeOOH (g/l): solids content in terms of FeOOH per litre of nucleus pH: pH after end of reaction Temperature (° C.): average reaction temperature Time (h): reaction time after the beginning of air gassing The parameters which lead to the desired yellow iron oxide are depicted in Table 1.

TABLE 1

| Variable | Minimum | Maximum |
|---|---|---|
| BET ($m^2$/g) | 50 | 150 |
| FeOOH (g/l) | 5 | 50 |
| pH | 1.0 | 5.0 |
| Temperature (° C.) | — | 50 |

Pigment Production

Stirred tank with air and steam feed and circulation pump if desired.

Assemblies known to the skilled worker for separating off the coarse solids and storing the suspension after the end of reaction. The empty clean reactor was charged with 15 t of scrap iron.

The nucleus was pumped into the reactor and the volume was made up to 110 m³ with water. The iron sulphate heptahydrate (FeSO$_4$.7H$_2$O) concentration was adjusted to a concentration of 45 g/l.

Steam, air and temperature quantities were adjusted as per Table 2. If necessary, water was added to make the volume up to 120 to 130 m³.

The reaction was at an end when the desired colour coordinates had been reached. Steam and air were shut off after the reaction and the product passes through operations of removal of coarse solids and of washing, before being filtered.

The effect of the excess scrap iron was like that of a neutralizing agent for the sulphuric acid which is formed in this reaction, and which was present as a constant source for the formation of iron sulphate.

Indicated below in Table 2 are the parameters which are monitored in the operation to obtain the respective type.

TABLE 2

| Type | Examples 1-3 | Comparative Example 1 | Comparative Example 2 |
|---|---|---|---|
| Nucleus (m³) | 40 | 15 | 20 |
| Nucleus (t) | 0.68 | 0.25 | 0.33 |
| BET (m²/g) | 65 | 77 | 74 |
| S.C. (g/l) | 77 | 98 | 84 |
| Reaction (t) | 10.2 | 12.8 | 11.2 |
| Reaction hours (h) | 170 | 123 | 84 |
| Final sulphate (g/l) | 29 | 29 | 30 |
| Reaction temp. (° C.) | 70 | 75 | 75 |
| Air throughput (m³/h) | 255 | 340 | 340 |

The key to the parameters indicated in Table 2 is as follows:
Nucleus (m³) corresponds to the volume of nucleus used.
Nucleus (t) corresponds to the mass of nucleus present in the volume.
BET (m²/g) corresponds to the surface area of the crystal.
S.C. (g/l) corresponds to the FeOOH concentration at the end of the reaction.
Reaction corresponds to the total mass of FeOOH at the end of the reaction.
h corresponds to the number of reaction hours.
Final sulphate g/l corresponds to the concentration in g/l of iron sulphate heptahydrate at the end of the reaction.

The product was washed salt-free so that the conductivity of the wash water running off was approximately not more than 2 mS/cm.

At the end of the filtering operation an iron oxide paste with a moisture content of approximately 50% was obtained.

For the drying assembly, all common driers are suitable in principle. In accordance with the invention the drier used was a "continuous drier with a dual drying stage", known to the skilled worker as a rotary tube drier.

The product was dried to a final residual moisture content of ≦10%. After that it was conveyed to the grinding stage.

The drying parameters set were as follows:
Pressure (steam)=10±1 g/cm²
Temperature of the first drying stage=185±10° C.
Ampere number of the first drying stage=180±20 A
Temperature of the second drying stage=175±10° C.
Ampere number of the second drying stage=70±20 A For grinding it is possible for example to use a mill known to the skilled worker: a horizontal classifier mill or a vertical mill (turbine type) without classifier.

Grinding was carried out in the vertical mill of the turbine type: micronization took place in a horizontal mill of turbine type with a coupled classifier.

The grinding parameters set were as follows:
Horizontal mill of turbine type with coupled classifier:
Rotation of feed=200±100 rpm
Rotation of mill=1750 rpm
Rotation of classifier=850±200 rpm
Vertical mill of turbine type without classifier:
Rotation of mill=1750 rpm
Rotation of feed=200±100 rpm The results of the Inventive and Comparative Examples are set out in Tables 3 and 4.

TABLE 3

| | Bulk density [g/cm³] | Tamped density [g/cm³] | BET [m²/g] | Oil absorption number [g pigment/ 100 g oil] | Water absorption value [g pigment/ 100 g water] | Dispersibility | | | Viscosity in MAP [ΔKU] |
|---|---|---|---|---|---|---|---|---|---|
| | | | | | | [μm] | [μm] | [μm] | |
| Example 1 | 0.57 | 0.79 | 16.5 | 23.4 | 42.8 | 10 | 15 | 25 | −19 |
| Example 2 | 0.55 | 0.76 | 16.7 | 23.6 | 38.6 | 10 | 20 | 30 | −18 |
| Example 3 | 0.52 | 0.75 | 15.5 | 23.2 | 37.7 | 15 | 20 | 30 | −21 |
| Comparative Example 1 | 0.56 | 0.82 | 16.2 | 23.2 | 38.0 | 60 | 80 | 90 | −22 |
| Comparative Example 2 | 0.66 | 0.92 | 15.3 | 21.7 | 36.2 | 25 | 35 | 55 | −23 |
| Ferrit ® Y25LO | 0.64 | 0.88 | 16.5 | 23.2 | 40.5 | 100 | — | — | −19 |
| Bayferrox ® 3910LV Standard 1987 | 0.36 | 0.52 | 14.8 | 30 | 61.4 | 10 | 15 | 20 | 0 |
| Bayferrox ® 3910 Standard 1987 | 0.36 | 0.52 | 14.8 | 30 | 61.4 | 10 | 15 | 20 | +18 |
| Bayferrox ® 3920 Standard 2002 | — | 0.63 | 13.3 | 31 | 44.0 | 15 | 20 | 30 | −4 |

TABLE 4

| | Colour coordinates in L 64/dispersing apparatus: plate-type paint grinding machine | | | | | | | | Reduction ratio for standard |
|---|---|---|---|---|---|---|---|---|---|
| | Full shade | | | | White reduction | | | | depth of shade |
| | L* | a* | b* | C* | L* | a* | b* | C* | 1/9 |
| Example 1 | 62.9 | 10.1 | 50.0 | 51.0 | 82.3 | 4.6 | 37.1 | 37.4 | −5.8 |
| Example 2 | 62.5 | 10.5 | 49.5 | 50.6 | 82.2 | 4.7 | 36.5 | 36.8 | −6.3 |
| Example 3 | 62.3 | 10.4 | 49.4 | 50.5 | 82.2 | 4.7 | 36.1 | 36.4 | −6.5 |
| Comparative Example 1 | 59.5 | 11.4 | 47.8 | 49.1 | 82.0 | 5.1 | 32.7 | 33.0 | −9.0 |
| Comparative Example 2 | 60.7 | 10.5 | 47.7 | 48.8 | 81.9 | 4.7 | 34.4 | 34.7 | −7.5 |
| Ferrit ® Y25LO | 60.7 | 10.7 | 48.6 | 49.8 | 82.1 | 4.8 | 34.6 | 35.0 | −7.5 |
| Bayferrox ® 3910LV Standard 1987 | 62.8 | 9.9 | 49.6 | 50.5 | 82.1 | 4.6 | 37.5 | 37.7 | −5.4 |
| Bayferrox ® 3910 Standard 1987 | 62.8 | 9.9 | 49.6 | 50.5 | 82.1 | 4.6 | 37.5 | 37.7 | −5.4 |
| Bayferrox ® 3920 Standard 2002 | 61.4 | 10.5 | 48.9 | 50.1 | 81.5 | 4.9 | 36.7 | 37.0 | −5.3 |

BRIEF DESCRIPTION OF THE DRAWINGS

FIG. 1 shows a 3-box method spread of <25/-/- µm.
FIG. 2 shows a 3-box method spread of <10/25/35 µm.
FIG. 3 shows a 3-box method spread of 15/-/- µm.
FIG. 4 shows a 3-box method spread of 10/25/- µm.
FIG. 5 shows a 3-box method spread<10/-/30 µm.
FIG. 6 shows a 3-box method spread of <10/25/35 µm.

Figures 1, 2, 3, 4:
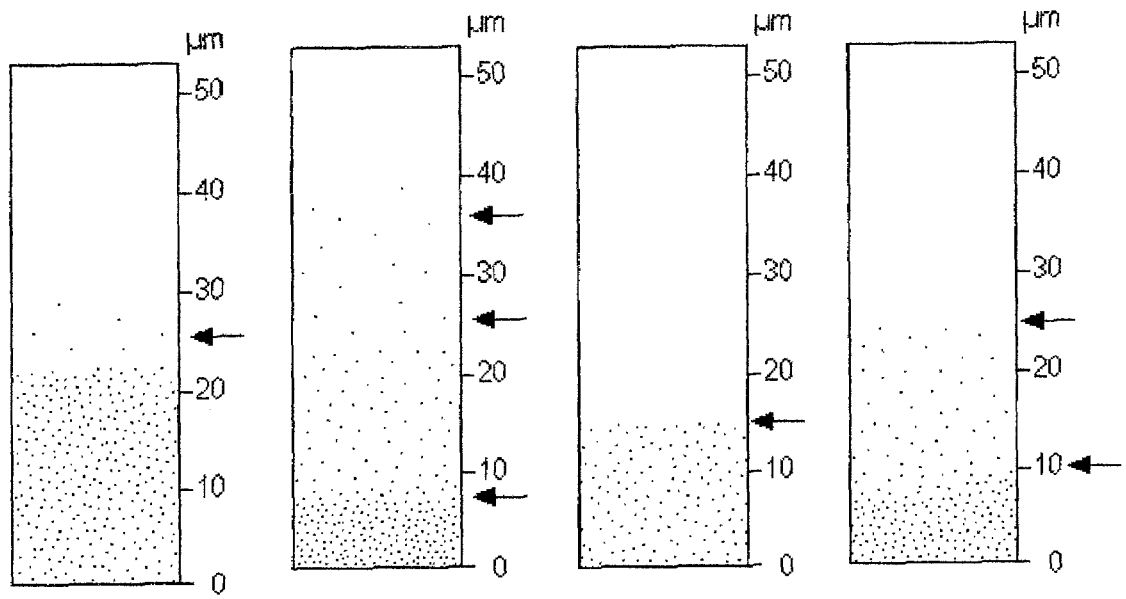
FIGS. 1 to 6 show the results of the "3-box" method employed for testing the pigments. A trio of values is thereby recorded, which characterizes the upper limits of the three regions indicated.
Figures 5, 6:
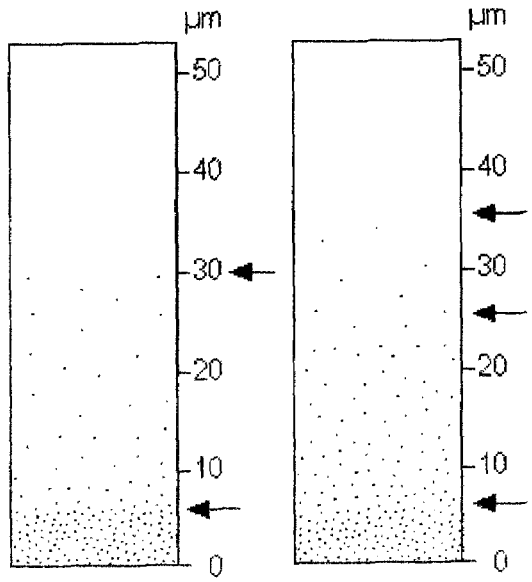

What is claimed is:

1. Yellow iron oxide pigment having
an oil absorption value of less than 25 and either
an a* value of of greater than 4.3 measured by CIELAB units in white reduction in L64 according to DIN 6174 and/or a b* value of greater than 34 measured by CIELAB units in white reduction in L64 according to DIN 6174 or
an a* value of greater than 10 measured by CIELAB units in full shade according to DIN 6174 and/or a b* value of of greater than 45 measured by CIELAB units in full shade according to DIN 6174,
and a reduction ratio for standard depth of shade B 1/9 according to DIN 53235 Part 1 and 2 of less than or equal to −6.5.

2. Yellow iron oxide pigment according to claim 1, wherein the yellow iron oxide pigment has a dispersibility according to EN 21524/DIN ISO 1524 (2002) in a "3-box method" form of less than 30-50-70 µm, respectively.

3. Yellow iron oxide pigment according to claim 1, wherein the yellow iron oxide pigment has a water absorption value of less than 50.

4. Yellow iron oxide pigment according to claim 1, wherein the yellow iron oxide pigment has a BET of greater than 14.

5. Yellow iron oxide pigment according to claim 1, wherein the yellow iron oxide pigment has a bulk density of greater than 0.4.

6. Yellow iron oxide pigment according to claim 1, wherein the yellow iron oxide pigment has a tamped density of greater than 0.7.

7. Process of using the yellow iron oxide pigment according to claim 1, comprising: mixing the yellow iron oxide pigment with organic or inorganic dispersions, products of the ink, paint, coating, building-material, plastics and paper industries, foods or products of the pharmaceutical industry.

8. Process of using according to claim 7, wherein the products of the pharmaceutical industry are tablets.

* * * * *